United States Patent [19]

Stracquadaini

[11] Patent Number: 5,275,325
[45] Date of Patent: Jan. 4, 1994

[54] PRESSURIZATION SYSTEM INLET ASSEMBLY FOR SUPERPLASTIC FORMING AND DIFFUSION BONDING

[75] Inventor: Salvatore J. Stracquadaini, West Islip, N.Y.

[73] Assignee: Grumman Aerospace Corporation, Bethpage, N.Y.

[21] Appl. No.: 988,873

[22] Filed: Dec. 10, 1992

[51] Int. Cl.⁵ .............................................. B21C 37/00
[52] U.S. Cl. .................................. 228/44.3; 228/157; 72/60
[58] Field of Search ...................... 228/157, 243, 44.3, 228/57; 29/239, 421.1; 72/60, 709

[56] References Cited

U.S. PATENT DOCUMENTS 4,304,350 12/1981 Paez et al. ............................ 228/157
4,901,552 2/1990 Ginty et al. .......................... 228/157

*Primary Examiner*—Samuel M. Heinrich
*Attorney, Agent, or Firm*—Pollock, Vande Sande & Priddy

[57] ABSTRACT

In a system for superplastic forming and diffusion bonding of metal layers, an inlet fitting is employed which includes a threaded barrel and a headed threaded male connector. The latter is threadingly received within the threaded barrel and creates a positive sealing relationship between the inlet fitting and a sandwich sheet undergoing processing. The inlet fitting has an axial bore formed therethrough to allow evacuation and pressurization of a manifold groove formed between the two sandwich sheets undergoing processing.

5 Claims, 1 Drawing Sheet

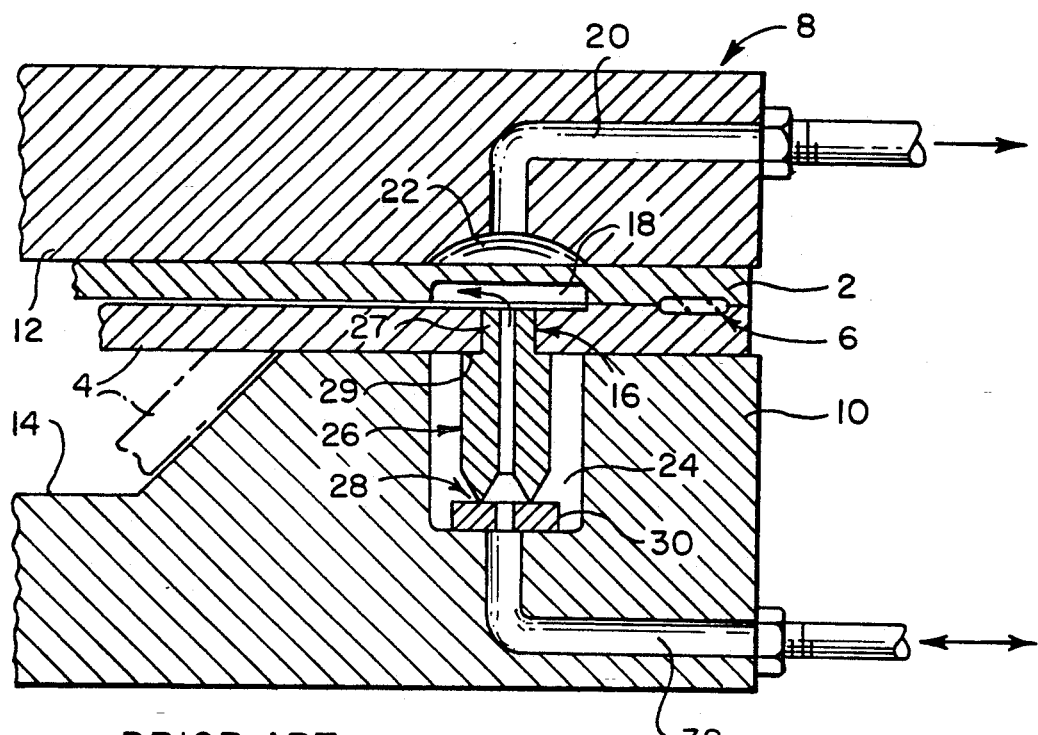
PRIOR ART
FIG. 1
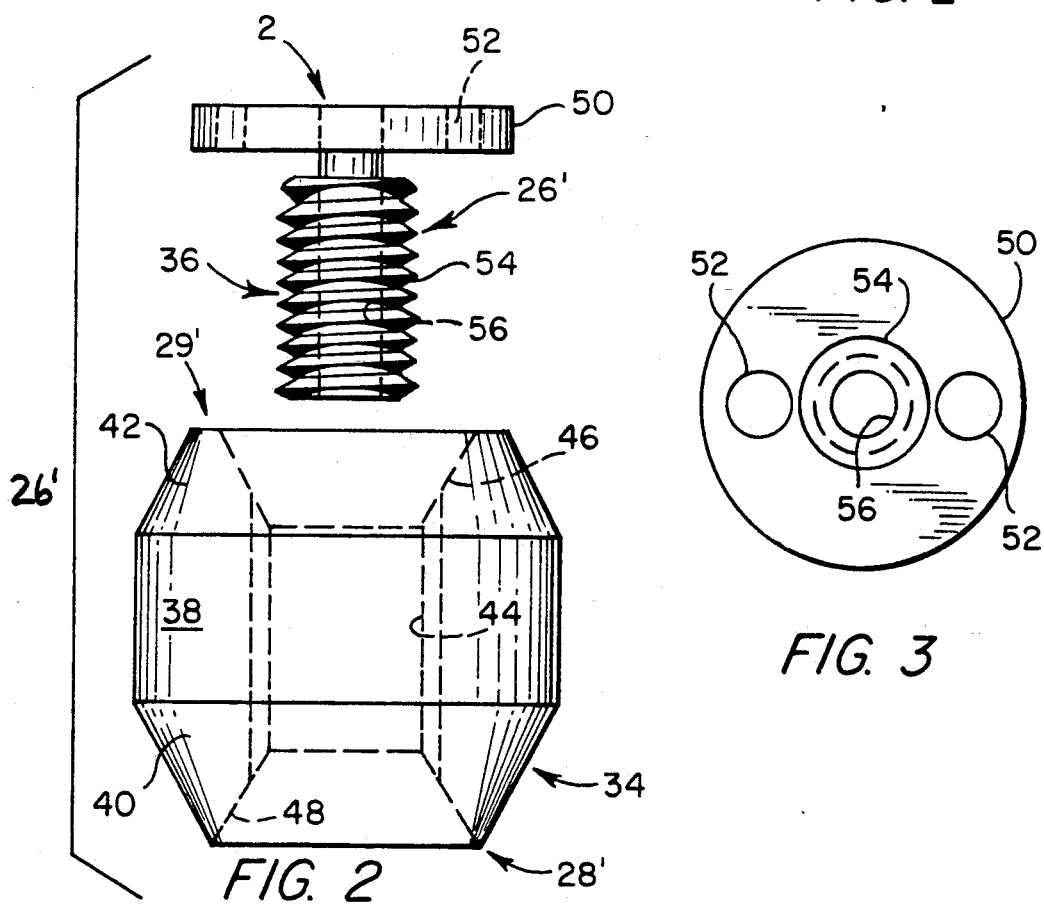
FIG. 2
FIG. 3

PRESSURIZATION SYSTEM INLET ASSEMBLY FOR SUPERPLASTIC FORMING AND DIFFUSION BONDING

FIELD OF THE INVENTION

The present invention relates to superplastic forming and diffusion bonding of metals, and more particularly to a pressure inlet assembly for such a forming system particularly suited for aluminum alloys.

BACKGROUND OF THE INVENTION

The process of superplastic forming and diffusion bonding of metals is well known in the art. A summary of such a process and a system for accomplishing such a process is disclosed in U.S. Pat. No. 4,304,350 to Paez, et al., issued Dec. 8, 1981, to the present assignee. The present invention deals with an improvement of an inlet assembly, as will be discussed hereinafter.

Briefly, the process of superplastic forming and diffusion bonding has the advantages of forming complex shapes and permitting deep drawing of metallic parts. At the temperatures involved the deformation stresses are relatively low, which permits the forming of complex parts under pressures which keep tool deformation and wear at a minimum.

Diffusion bonding which is used in conjunction with superplastic forming refers to the metallurgical bonding or joining of metal by the steps of applying heat and pressure for periods of time sufficient to cause comingling of the metal atoms at the places where the surfaces are joined.

The superplastic forming and diffusion bonding process is particularly useful in the aerospace industry in the formation of wings, frames, and the like. The process is particularly useful in forming strengthening members used in aerospace structures referred to as frames and stringers.

Generally speaking, the process begins with cleaning the metal sheets to be used in the sandwich. The sheets are then selectively coated with a material commonly referred to as "stop-off" which typically is boronnitride, yttria, or some rare earth or other very inert material. The purpose of the "stop-off" is to prevent diffusion bonding of the sandwich-like material where the stop-off material has been applied. The areas coated with "stop-off" can be formed into a desired shape by the application of gas pressure applied to the inside of the metallic sandwich. Prior art systems have not been reliable for commercial production. In some prior art practices, an inlet tube was inserted between the sandwich layers to be used to evacuate the space between the sandwich layers and to thereafter supply gas under pressure to the spaces between the sandwich to form the sandwich into the desired honeycomb shape by superplastic forming.

In prior practices, after inserting the tube between titanium sandwich layers, the sandwich construction sometimes was welded around its periphery to form a unitary structure or was bonded during the superplastic forming, diffusion bonding cycle to form an assembly sometimes called a bag. Typically, this was accomplished by seam welding or under heat and pressure by diffusion bonding. In many operations there were more than one such inlet tubes.

One problem that has arisen as a result of these prior art practices where the inlet tube extended into the sandwich was that, while welding the peripheries of the sandwiched sheets, one or more of the inlet tubes would be pinched closed and rendered inoperable. Where this occurred, the subsequent operations were severely adversely affected, sometimes resulting in complete failure to form the desired assembly.

In another approach a tube was welded to the bag. The weld is susceptible to cracks that could break the seal which should exist between the inlet tube and the sandwich construction which also would adversely affect the superplastic forming operation.

In the previously identified U.S. Pat. No. 4,304,350, an improved system and process relating to titanium sheets is disclosed. That invention includes upper and lower die members which receive the sandwich assembly. The die members include passageways adapted to direct gases to and from the sandwich assembly. One of the die members has a recess in which is positioned a hollow metal pin preferably made of stainless steel. One end of the hollow pin is in sealing relationship within an opening in the bottom layer or sheet of the sandwich. The other end of the hollow pin has a knife-like edge and is in sealing relationship with a washer-like member within the recess. A feature of the invention is that the stainless steel tube is directed to the sandwich in a direction perpendicular to the sandwich rather than parallel to the sandwich.

In operation, the hollow pin is press fitted in the hole in the bottom sheet of the sandwich. The sheets are then cleaned and stop-off, preferably boron-nitride, selectively applied to the sheets to determine the shape of the structural article and the areas of diffusion bonding of the sheets.

The titanium sandwich sheets are then seam welded around the periphery to form an assembly. The assembly is placed in a cavity formed by dies and a seal effected between the hollow stainless steel pin and the die in which it is located. The dies are brought together to apply a squeezing pressure to that portion of the assembly to be diffusion bonded. The assembly is heated to about 1650° F. and the sandwich is subjected to an inert gas, preferably argon, to prevent contamination of the sandwich surfaces. Thereafter, the assembly is heated for a prolonged period at about 1650° F. while inert gas under pressure is directed to the interior of the sandwich assembly to form a structural assembly.

BRIEF DESCRIPTION OF THE PRESENT INVENTION

The present invention is directed to an improvement of the inlet assembly for a system such as disclosed in the previously issued patent. The improved inlet assembly is particularly adapted to processes involving aluminum sheets instead of titanium sheets, as was disclosed in the prior patent. With the present invention aluminum alloy sheets for such materials as 7000 Series or 7475 Schedule B may be processed in accordance with the method set forth in the prior patent. However, the inlet assembly, of the prior patent, namely a hollow tube, press fit into one of the sandwich layers, cannot be successfully used with these aluminum alloys. Accordingly, the present invention is directed to a modification of the prior structure so that the inlet assembly will remain intact during evacuation and pressurization modes.

In order to accomplish this, the inlet assembly utilizes a hollowed barrel member which is positioned within the same die inlet recess as exists in the patent. However, with the present invention a headed male connector fitting is threadingly received within the barrel member to complete an inlet. The utilization of a two-piece assembly assures retention of the inlet within an aluminum sandwich sheet during an entire superplastic diffusion bonding process.

BRIEF DESCRIPTION OF THE FIGURES

The above-mentioned objects and advantages of the present invention will be more clearly understood when considered in conjunction with the accompanying drawings, in which:

FIG. 1 is a cross-sectional view illustrating the prior art system set forth in U.S. Pat. No. 4,304,350;

FIG. 2 is an elevational unassembled view of the invention;

FIG. 3 is an end view of a barrel member employed in the invention.

DETAILED DESCRIPTION OF THE PRESENT INVENTION

A thorough discussion of the most relevant prior art, shown in FIG. 1, will now be discussed to facilitate an understanding of the invention. The prior art, like the present invention, is particularly useful in superplastic forming and diffusion bonding of a sandwich construction consisting of two or more layers of metal which are capable of being superplastically formed. The prior art invention, as well as the present invention, is useful in forming honeycomb-like and stringer-stiffened structural shapes used in the aerospace industry. With the prior art, sheets of titanium and certain titanium alloys were employed whereas in the present invention an improved inlet system is presented for accommodating aluminum alloy sheets.

Concerning the particular structure of the prior art shown in FIG. 1, there are metal layers 2 and 4, capable of being diffusion bonded and superplastically formed into a desired structural shape.

The layers 2 and 4 are selectively coated with stopoff such as boron nitride, yttria or other inert material to prevent diffusion bonding of the layers in the areas where stop-off has been applied. The sandwich layers are then joined adjacent their peripheries by spot or seam welding 6 to thereby form a layered or sandwiched assembly. The layered assembly is then placed between a pair of die members 8, 10.

The die members are interiorly shaped in accordance with the desired final shape of the sandwich or stringer-stiffened construction. As illustrated, the lower face 12 of the upper die 8 is substantially flat, whereas the lower die 10 has a cavity 14. However, for some applications (i.e., bulkheads) both surfaces may be recessed.

As can be seen in the drawing, the lower layer can, during the operation, assume the shape shown in dot-dash lines. It is possible by superplasticity to form very complex shapes if so desired.

The upper layer 2 has a groove 18 in its lower surface which permits gas to pass easily into the interior of the sandwich assembly.

The upper die 8 has a passageway 20 which terminates at one end in a half-dome-shaped recess 22 which accommodates the upper sandwich layer when the vacuum is applied through the passageway 20 which is connected to any suitable source of vacuum not shown.

Means is provided for directing gases through one of the sandwiched layers to and from the interior of a metal sandwich construction in a sealed manner. This means includes a stainless steel hollow pin 26 (preferably RA 330 stainless) having a reduced diameter portion 27 which fits into a hole 16 in the lower layer of the sandwich. The reduced diameter portion 27 forms a shoulder 29 adapted to transmit force from the upper die to the pin 26 when the upper and lower dies are brought together.

The other end of the hollow stainless steel pin is tapered so as to form a pointed, knife-like edge 28. The hollow pin 26 is positioned within a recess 24 in the lower die and may be circular in cross section. Positioned at the bottom of the recess 24 is a washerlike sealing element 30. Preferably, the sealing element is made of relatively soft material such as copper. In this way, the knife-like edge 28 of the stainless steel pin can become embedded in the copper washer and form a sealing relationship therewith. The lower die 10 also includes a passageway 32 which communicates with the inside of the hollow stainless steel pin to thereby direct gases towards and away from the sandwich construction.

In operation, the reduced diameter portion 27 of the hollow stainless steel pin is press fitted into the hole 16 in the lower layer of the sandwich. The sheets are cleaned and selectively treated with stop-off to control the areas of diffusion bonding depending on the desired final shape. The peripheries of the top and bottom sheets are seam or spot welded at 6 to form a sandwich assembly.

The sandwich assembly is placed between the upper 8 and lower dies 10 and the upper die is forced downwardly to effect a seal between the hollow stainless steel pin and the copper washer.

The dies and the assembly are then heated to about 1650° F. and the gases between the layers are evacuated to prevent contamination of the sandwiched surfaces. In addition, since the stainless steel pin has a higher coefficient of expansion than the sandwiched titanium material, the reduced diameter portion of the hollow stainless steel pin will expand more than the hole in the titanium sheet, thus ensuring a tight sealed fit between the stainless steel pin and the lower sandwich sheet.

An inert gas such as argon is directed through the passageway 32, through the opening in the washer, through the hollow pin and to the interior of the metal sandwich. The gas will, in the embodiment shown in the drawing, expand the lower layer of the metal sandwich into the die cavity 14 by superplastic forming the layer 4. The argon gas is under pressure starting relatively low and building up to about 300 pounds per square inch.

The present invention is directed to an improved inlet to the system just described in connection with FIG. 1. The present improvement has particular application to the superplastic forming and diffusion bonding of aluminum alloy sandwich layers instead of the prior art titanium alloys. The improvement of the present invention is directed to a two-part inlet pin instead of the unitary pin 26 employed in the prior art just discussed and which was press fit into a lower titanium sandwich sheet. The prior art unitary pin construction will not perform as well as it does in titanium due to several significant metallurgical differences between aluminum alloys and titanium alloys, as is well known by those having ordinary skill in the art. The general system described in connection with FIG. 3 is also employed in connection with aluminum alloys which are capable of being superplastically formed. Typical aluminum alloys may include 7000 Series and 7475 Schedule B.

FIG. 2 illustrates the inlet fitting of the present invention, generally indicated by reference numeral 26'. The fitting is seen to include a threaded barrel member 34 and a threaded male connector member, which is received within an interior bore of the barrel member 34 and which creates a positive sealing relationship between the assembled fitting and a lower sandwich layer. Although the present inlet fitting exhibits superior performance in aluminum alloys, it may equally well be installed in structures of titanium alloys or any other metal which may be fabricated as a result of superplastic forming and diffusion bonding such as explained in the prior art patent.

The barrel member 34 includes a median section 38 which converges along a frusto-conical section 40 to form a circular knife edge 28', as was the case in the prior art pin of FIG. 1 wherein the knife edge was indicated by reference numeral 28. An opposite end of the barrel member has a frusto-conical section 42 that terminates outwardly in an annular shoulder 29' corresponding to the shoulder 29 of the prior art device. An axial threaded bore 44 is formed within the barrel member and the upper end of the threaded bore 44 extends to a countersink opening 46 while at the opposite end of the threaded bore a countersink opening 48 is formed.

The threaded male connector 36 is adapted to be received through the opening 46 while the knife edge 28' is exposed to become embedded in a copper washer so as to form a sealing relationship therewith, as was the case with the prior art pin 26 (FIG. 1).

The threaded male connector 36 includes a circular head 50 having two holes 52 formed therein to receive a spanner wrench to tighten the threaded male connector 36 within barrel member 34. As will be seen from viewing the drawing, the threaded male connector 36 has a stem portion 54, which is exteriorly threaded and adapted to be received within the threaded bore 44 of the mating barrel member 34.

An axial bore 56 is formed along the entire length of the threaded male connector 36. Thus, with the two parts indicated in FIG. 2 connected within one another and installed within a recess 24 of a die 10 (FIG. 1), vacuum and positive pressure may communicate between passageway 32, washer 30, the central bore existing in threaded barrel member 34, and male connector 36. Since the apertured head 50 of male connector 36 will be received within groove 18 in the upper metal layer 2, the groove will act as a manifold during evacuation and pressurization as was the case with the previously identified prior patent.

It should be mentioned that, in the case of titanium, the metal layers undergoing processing may be welded together. However, in the case of aluminum alloys, welding is an impractical technique and instead, a mechanical seal between the layers must be employed, such as an 0 ring positionable where the weld 6 exists in FIG. 1.

Accordingly, the present inlet fitting, comprising the fastened-together barrel member 34 and male connector 36, creates a positive sealing relationship between the inlet and the aluminum sandwich sheets creating a reliable inlet for a forming system.

It should be understood that the invention is not limited to the exact details of construction shown and described herein for obvious modifications will occur to persons skilled in the art.

I claim:

1. In a system for superplastic forming and diffusion bonding a metal work piece sandwich having at least first and second layers between upper and lower dies to form the sandwich into a preselected structural shape, an improved inlet fitting located in a recess formed in one of the dies, the fitting providing positive and negative pressure flow between the layers and comprising:
   a generally barrel-shaped member having an axial bore extending therethrough, the bore being centrally threaded;
   a male connector having an externally threaded stem received in a aperture formed in a layer and fastened within the barrel member, the connector including
   a) a bore formed therethrough for creating a passage through an assembled inlet fitting; and
   b) a headed portion for clamping against one surface around the apertured layer while a confronting first end of the barrel member clamps against an opposite surface around the apertured layer for positively sealing the fitting to the apertured layer.

2. The inlet fitting set forth in claim 1 wherein the first end of the barrel member has an annular shoulder formed therearound.

3. The inlet fitting set forth in claim 2 wherein an opposite end of the barrel member has a circular knife edge formed therearound for embedding the inlet fitting into a soft metal washer located at the base of the recess, the washer communicating between an internal die passageway and the axial passage through the fitting.

4. The fitting set forth in claim 3 wherein each end of the barrel member has a countersunk hole formed therein.

5. In a system for superplastically forming and diffusion bonding at least two aluminum alloy sandwich sheets between upper and lower dies, one of the dies having a recess for receiving an inlet fitting which provides pressure communication between a passageway formed in one of the dies and a manifold groove between the sheets, an improved fitting comprising:
   a generally barrel-shaped member having an axial bore extending therethrough, the bore being centrally threaded;
   a male connector having an externally threaded stem received in a aperture formed in an aluminum alloy sheet and fastened within the barrel member, the connector including
   a) a bore formed therethrough for creating a passage through an assembled inlet fitting; and
   b) a headed portion for clamping against one surface around the apertured sheet while a confronting first end of the barrel member clamps against an opposite surface around the apertured sheet for positively sealing the fitting to the apertured sheet; wherein
   an opposite end of the barrel member has a circular knife edge formed therearound for embedding the inlet fitting into a soft metal washer located at the base of the recess, the washer communicating between an internal die passageway and the axial passage through the fitting; and further wherein
   each end of the barrel member has a countersunk hole formed therein.

* * * * *